United States Patent Office 3,161,667
Patented Dec. 15, 1964

3,161,667
VINYLIDENE AROMATIC PHOSPHORUS MONOMERS
John G. Abramo, Albert Y. Garner, and Earl C. Chapin, Springfield, Mass., assignors to Monsanto Company, a corporation of Delaware
No Drawing. Filed Jan. 4, 1960, Ser. No. 15
7 Claims. (Cl. 260—461)

This invention relates to novel vinylidene monomers containing reactive phosphorus groups. More particularly, it relates to novel ethylenically unsaturated aromatic compounds containing phosphomethyl oxide groups substituted on the aromatic nuclei.

The technology of phosphorus polymers has heretofore remained relatively undeveloped. However, these polymers are growing increasingly attractive for use in specialized applications wherein their novel properties may be advantageously utilized.

It is an object of this invention to provide novel phosphorus containing vinylidene monomers.

Another object is the provision of novel vinylidene aromatic monomers containing phosphomethyl oxide groups and a process for their manufacture.

A further object is the provision of novel flame resistant polymers.

These and other objects are attained by contacting a beta-haloalkyl halomethyl aromatic compound of the class herein after described with an organophosphorus compound of the class hereinafter described at a temperature of from 50–200° C. to form novel intermediates which are subsequently dehydrohalogenated in the presence of an alkali metal base.

The following examples are presented in illustration of the invention and are not intended as limitations thereon.

Example I

Seventy-five grams (about 0.4 mol) of para-(beta-chloroethyl)benzyl chloride and 66 grams (about 0.4 mol) of triethyl phosphite are charged to a stirred reactor and heated at a temperature of about 90±5° C. for 20 hours. The resulting reaction mixture is vacuum distilled, yielding a fluid intermediate product boiling at about 185–190° C. at 3 mm. of mercury pressure. This intermediate product is identified by infrared and elemental analysis as diethyl para-(beta-chloroethyl) benzylphosphonate. The intermediate is combined with 0.1 gram of tertiarybutyl catechol and a solution of 23 grams (about 0.4 mol) of potassium hydroxide dissolved in 500 ml. of ethanol in a second stirred reactor. This reaction mixture is heated at reflux (circa 78° C.) for 6 hours, then poured into water, extracted with benzene and then distilled to remove water and benzene. The residue is vacuum distilled to yield a fluid product having a boiling point of about 120° C. at 0.2 mm. of mercury pressure in about 60% yield. Infrared spectroscopy and elemental analysis establish the product as diethyl para-vinyl benzylphosphonate.

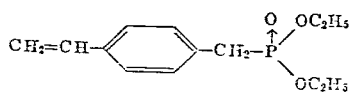

Example II

Seventy-five grams (about 0.4 mol) of meta-(beta-chloroethyl) benzylchloride and 100 grams (about 0.4 mol) of triphenyl phosphite are charged to a stirred reactor and heated at a temperature of about 100±5° C. for 18 hours. The resulting reaction mixture is vacuum distilled, yielding a fluid intermediate product which is identified by infrared and elemental analysis as diphenyl meta-(beta-chloroethyl) benzylphosphonate. The intermediate is combined with 0.1 gram of tertiarybutyl catechol and a solution of 50 grams (about 0.4 mol) of sodium phenolate dissolved in 300 ml. of acetone in a second stirred reactor. This reaction mixture is heated at reflux (circa 56° C.) for 10 hours, then poured into water, extracted with ether, dried and evaporated to remove the ether. The residue is vacuum distilled to yield a fluid product which is identified by infrared spectroscopy and elemental analysis as diphenyl meta-vinyl benzylphosphonate.

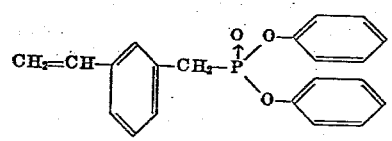

Example III

Twenty grams (about 0.1 mol) of para-(beta-chloroisopropyl) benzylchloride and 14 grams (about 0.1 mol) of diethyl methylphosphonite are charged to a stirred reactor and heated at a temperature of about 80±5° C. for 18 hours. The resulting reaction mixture is vacuum distilled, yielding a fluid intermediate product which is identified by infrared and elemental analysis as ethyl para-(beta-chloroisopropyl) benzyl methylphosphinate. The intermediate is combined with 0.1 gram of tertiary butyl catechol and a solution of 6 grams (about 0.1 mol) of potassium hydroxide dissolved in 500 ml. of ethanol in a second stirred reactor. This reaction mixture is heated at reflux (circa 78° C.) for 6 hours, then poured into water, extracted with benzene and then distilled to remove water and benzene. The residue is vacuum distilled to yield a fluid product which is identified by infrared spectroscopy and elemental analysis as ethyl para-isopropenyl benzyl methylphosphinate.

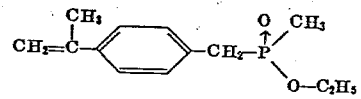

Example IV

Twenty-four grams (about 0.1 mol) of 1-(beta-chloroethyl)-4-chloromethyl naphthalene and 20 grams (about 0.1 mol) of diethyl phenylphosphonite are charged to a stirred reactor and heated at a temperature of about 100±5° C. for 20 hours. The resulting reaction mixture is vacuum distilled yielding a fluid intermediate product which is identified by infrared and elemental analysis as 1-(beta-chloroethyl)-4-(ethyl phenylphosphinatomethyl) naphthalene. The intermediate is dissolved in 50 ml. of dioxane, which solution is then combined with 0.1 gram of tertiary butyl catechol and a solution of 4 grams (about 0.1 mol) of sodium hydroxide dissolved in 300 ml. of ethanol in a second stirred reactor. This reaction mixture is heated at reflux (circa 80° C.) for 6 hours, then poured into water, extracted with benzene and then distilled to remove water and benzene. On cooling, a crystalline product is obtained which is identified by infrared spectroscopy and elemental analysis as 1-vinyl-4-(ethyl phenylphosphinatomethyl) naphthalene.

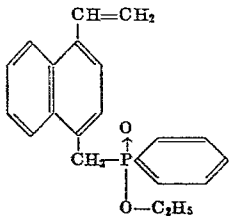

Example V

Seventy-five grams (about 0.4 mol) of para-(beta-chloroethyl) benzylchloride and 85 grams (about 0.4 mol) of methyl diphenylphosphinite are charged to a stirred reactor and heated at a temperature of about 80±5° C. for 20 hours. The resulting reaction mixture is vacuum distilled yielding a solid intermediate product which is identified by infrared and elemental analysis as para-(beta-chloroethyl) benzyl diphenylphosphine oxide. The intermediate is combined with 0.1 gram of tertiarybutyl catechol and a solution of 23 grams (about 0.4 mol) of potassium hydroxide dissolved in 600 ml. of ethanol in a second stirred reactor. This reaction mixture is heated at reflux (circa 78° C.) for 6 hours then poured into water, extracted with benzene and finally distilled to remove water and benzene. On cooling, a crystalline product is obtained which is identified by infrared spectroscopy and elemental analysis as para-vinyl benzyl diphenylphosphine oxide.

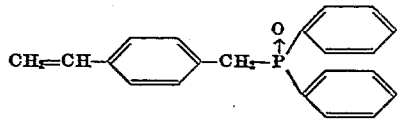

Example VI

Seventy-grams (about 0.4 mol) of para-(beta-chloroethyl) benzylchloride and 60 grams (about 0.4 mol) of methyl diisopropylphosphinite are charged to a stirred reactor and heated at a temperature of about 80±5° C. for 20 hours. The resulting reaction mixture is vacuum distilled yielding a solid intermediate product which is identified by infrared and elemental analysis as para-(beta-chloroethyl) benzyl diisopropylphosphine oxide. The intermediate is combined with 0.1 gram of tertiarybutyl catechol and a solution of 23 grams (about 0.4 mol) of potassium hydroxide dissolved in 600 ml. of ethanol in a second stirred reactor. This reaction mixture is heated at reflux (circa 78° C.) for 6 hours, then poured into water, extracted with benzene and finally distilled to remove water and benzene. On cooling, a crystalline product is obtained which is identified by infrared spectroscopy and elemental analysis as para-vinyl benzyl diisopropylphosphine oxide which has the structural formula:

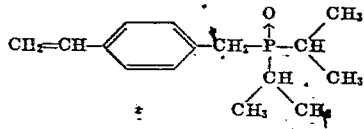

The beta-haloalkyl halomethyl aromatic compounds employed in the practice of this invention correspond to the general formula:

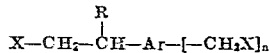

In this formula, $n$ is an integer of from 1–3, R may be either hydrogen or a methyl radical, each X is an independently selected halogen radical and Ar is a polyvalent aromatic residue containing from 6–14 carbon atoms and having a valency numerically equal to $n+1$. Therefore, the para-(beta-chloroethyl) benzylchloride, the meta-(beta-chloroethyl)benzylchloride, the para-(beta-chloroisopropyl) benzylchloride and the 1-(beta-chloroethyl)-4-chloromethyl naphthalene employed in the examples, may be replaced, for example, with one of the following, with equivalent results:

ortho-(beta-bromomethyl) benzylchloride,
para-(beta-iodoethyl) benzylbromide,
para-(beta-fluoroethyl) benzylchloride,
meta-(beta-chloroisopropyl) benzylfluoride,
2-(beta-chloroisopropyl) 6-chloromethyl naphthalene,
1-(beta-chloroethyl)-4-chloromethyl naphthalene,
9-(beta-bromoethyl)-10-chloromethyl anthracene,
1-(beta-chloroethyl)-2,4-di(chloromethyl) benzene,
1-(beta-bromoethyl)-3,6-di(chloromethyl) naphthalene,
2-(beta-chloroethyl)-9,10-di(bromomethyl) anthracene,
1-(beta-chloroethyl)-2,4,6-tri(chloromethyl) benzene,
2-(beta-chloroethyl)-1,4,6-tri(chloromethyl) naphthalene,
9-(beta-chloroethyl)-3,6,10-tri(chloromethyl) anthracene,
etc.

Mixtures of such compounds may also be employed.

The organophosphorus compounds employed in the practice of this invention are organic phosphinites, phosphonites and phosphites corresponding, respectively, to the following general formulae:

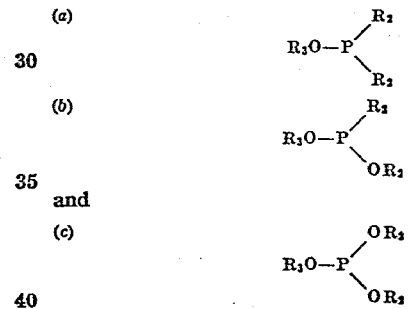

In each of these formulae, $R_3$ and each $R_2$ are independently selected hydrocarbon radicals containing from 1–20 carbon atoms. Therefore, the triethyl phosphite, the triphenyl phosphite, the diethyl methylphosphonite, the diethyl phenylphosphonite, the methyl diphenylphosphinite and the methyl diisopropylphosphinite employed in examples may be replaced, for example, with one of the following, with equivalent results: an alkyl dimethylphosphinite of the homologous series of from methyl dimethylphosphinite through eicosyl dimethylphosphinite, a methyl dialkylphosphinite of the homologous series of from methyl diethylphosphinite through methyl dieicosylphosphinite, methyl ethylpropylphosphinite, ethyl phenylbutylphosphinite, phenyl diphenylphosphinite, phenyl dimethylphosphinite, a dialkyl methylphosphonite of the homologous series of from dimethyl methylphosphonite through dieicosyl methylphosphonite, a diisopropyl alkylphosphonite of the homologous series of from diisopropyl methylphosphonite through diisopropyl eicosylphosphonite, a dialkyl phenylphosphonite of the homologous series of from dimethyl phenylphosphonite through dieicosyl phenylphosphonite, diphenyl phenylphosphonite, diphenyl ethylphosphonite, ethyl methyl phenylphosphonite, a trialkyl phosphite of the homologous series of from trimethyl phosphite through trieicosyl phosphite, a methyl dialkyl phosphite of the homologous series of from methyl diethyl phosphite through methyl dieicosyl phosphite, ethyl methyl propyl phosphite, ethyl diphenyl phosphite, tri-tolyl phosphite, tri-naphthyl phosphite, etc. Mixtures of such compounds may be employed if desired.

The novel ethylenically unsaturated aromatic phosphorus compounds of this invention are prepared in an essentially two-step process. In the first step, the beta-haloalkyl halomethyl aromatic compound and the organophosphorus compound, heretofore described, are co-reacted in substantially stoichiometric proportions at a temperature of from about 50–200° C. More particularly, at least 1 molar proportion of the organophosphorus compound is employed for each molar equivalent proportion ($n$) of halomethyl groups present in the beta-haloalkyl halomethyl aromatic compound. No solvent is required in this reaction. It is only necessary that at least one of the components be in a liquid state at the reaction temperature employed. An intermediate product corresponding to the general formula:

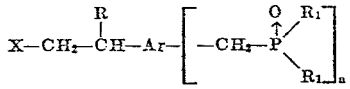

is obtained in this reaction. In this formula, $n$ is an integer of from 1–3, R is either a hydrogen or methyl radical, X is a halogen radical, and Ar is a polyvalent aromatic residue as heretofore disclosed. The $R_1$ radicals correspond to the $R_2$ and/or $OR_2$ radicals contained in the organophosphorus compound employed. This intermediate may be recovered from the reaction mixture in about 40–85% yield using conventional techniques, e.g., vacuum distillation, etc.

The intermediate products obtained above are beta-haloalkyl aromatic phosphorus compounds which may be further defined in terms of the organophosphorus compounds from which they are prepared. Thus, in various embodiments; organic phosphinites (Formula $a$, supra) may be employed to prepare beta-haloalkyl aromatic phosphine oxides corresponding to the general formula:

(a′) 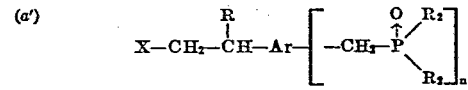

organic phosphonites (Formula $b$, supra) may be employed to prepare beta-haloalkyl aromatic phosphinates corresponding to the general formula:

(b′) 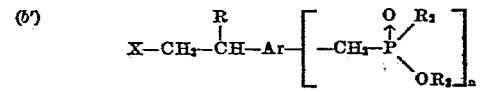

and organic phosphites (Formula $c$, supra) may be employed to prepare beta-haloalkyl aromatic phosphonates corresponding to the general formula:

(c′) 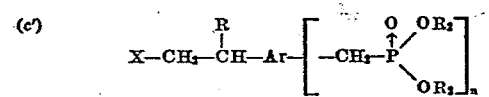

In the second step of this process, the intermediate obtained above is dehydrohalogenated in a substantially water-free polar solvent at a temperature of from about 50–120° C. employing an alkali metal base as the dehydrohalogenating agent, at least 1 molar proportion of alkali metal base should be employed for each molar proportion of intermediate. The ethylenically unsaturated aromatic phosphorus compounds produced are recovered from the final reaction mixture employing conventional techniques. For example, the final reaction mixture may be extended with water and the product extracted from said aqueous solution with benzene, followed by distillation to remove low-boiling constituents. The product may be further purified; for example, by vacuum distillation. In a preferred embodiment, the dehydrohalogenation, and especially the subsequent recovery of the product, is effected in the presence of a minor proportion, e.g., from about 0.01–2% by weight of a polymerization inhibitor. Conventional free radical scavengers such as tertiarybutyl catechol, hydroquinone, ditertiarybutyl cresol, phenylene diamine, sulfur, etc. may be employed in such function.

Suitable alkali metal bases for use in the dehydrohalogenation step of this process include, for example, alkali metal hydrides such as sodium hydride, potassium hydride, cesium hydride, etc.; alkali metal alkoxides such as sodium methoxide, potassium ethoxide, sodium dodecoxide, etc.; alkali metal phenolates such as sodium phenolate, etc.; alkali metal hydroxides such as lithium hydroxide, sodium hydroxide, potassium hydroxide, rubidium hydroxide or cesium hydroxide; trialkyl amines such as triethyl amine, triisobutyl amine, etc.; quinoline; etc.

Conventional polar solvents may be employed in the second step, i.e., the dehydrohalogenation, of this process. Examples of suitable polar solvents include 1–20 carbon atom aliphatic alcohols such as methanol, ethanol, isopropanol, butanol, hexanol, eicosanol, etc.; dioxane; acetone; tetramethylene sulfone; tetrahydrofurane; etc. To avoid the presence of water in the reaction system, substantially anhydrous polar solvents should be employed. The 1–20 carbon atom alcohols form a preferred embodiment of this invention. It is especially desirable to use an alcohol corresponding to the general formula:

in conjunction with reaction intermediates, i.e., the reaction products of step 1 of this process, containing alkyl phosphorus ester groups. In such case, the alcohol used should correspond to the alkyl group of the phosphorus ester, if possible, so as to preclude modification of the product because of ester interchange. In another embodiment of this invention, however, the principle of ester interchange is advantageously utilized, using an alcohol containing a higher molecular weight alkyl group than that contained in the phosphorus ester to replace the lower alkyl group of said phosphorus ester. A lower alcohol comprised of the original alkyl group of said phosphorus ester is formed and may be removed by subsequent evaporation.

The novel ethylenically unsaturated aromatic phosphorus compounds, prepared as heretofore described, may be broadly described as corresponding to the general formula:

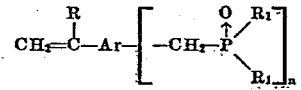

wherein $n$ is an integer of from 1–3, R is either a hydrogen or methyl radical, and Ar is a polyvalent aromatic residue as heretofore described. $R_1$ is a radical independently selected from the group consisting of $R_2$ and $OR_2$ radicals, heretofore disclosed as substituent groups on the organophosphorus compound.

Thus, in various embodiments of the overall process; organic phosphinites (Formula $a$, supra) may be employed to prepare ethylenically unsaturated aromatic phosphine oxides corresponding to the general formula:

(a″) 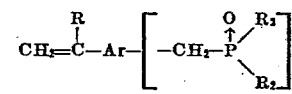

organic phosphonites (Formula $b$, supra) may be employed to prepare ethylenically unsaturated aromatic phosphinates corresponding to the general formula:

(b″) 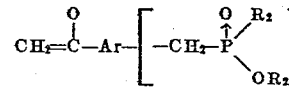

or organic phosphites (Formula $c$, supra) may be employed to prepare ethylenically unsaturated aromatic phosphonates corresponding to the general formula:

(c″) 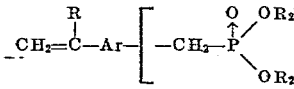

The products of this invention are generally viscous fluids. However, those of higher molecular weight, especially those containing the larger Ar or $R_2$ groups, may be crystalline or waxy solids. As a class, these compounds have been found to be flame-resistant. Thus, they find useful application as flame-proofing agents for paper, textiles, wood, etc. However, these compounds are especially important as monomers in the synthesis of novel flame-resistant polymers. Such polymers may also be employed as flame-proofing agents for the foregoing materials, or they may be molded, extruded or cast as sheets, films, tubing, etc. for use in such applications as electrical insulation, fire barriers, surface coatings, etc.

*Example VII*

Fifteen grams of the diethyl para-vinyl benzylphosphonate monomer prepared in Example I and 0.1 gram of ditertiarybutyl peroxide are charged to a reaction tube and placed under an inert atmosphere. The reaction mixture is heated at about 80° C. for 15 hours to produce a hard, transparent, amorphous polymer. Upon testing for flammability by holding a lump of this polymer in the flame of a Meeker burner until ignited, the polymer is found to be self-extinguishing. Infrared spectroscopy and elemental analysis establishes the polymer as corresponding to a plurality of recurring structural units of the formula:

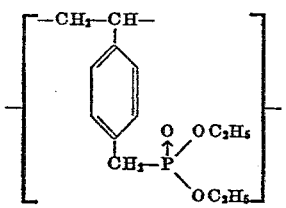

It is obvious that many variations may be made in the products and processes set forth above without departing from the spirit and scope of this invention.

What is claimed is:

1. A beta-haloalkyl aromatic phosphorus compound corresponding to the general formula:

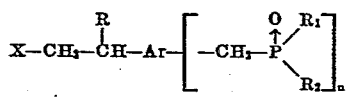

wherein X is a halogen radical, R is a radical selected from the group consisting of hydrogen and methyl, $n$ is an integer of from 1 to 3, Ar is a polyvalent aromatic residue selected from the group consisting of benzene, naphthalene and anthracene residues having a valency numerically equal to $n+1$, $R_2$ is a hydrocarbon radical containing from 1 to 20 carbon atoms and $R_1$ is a radical selected from the group consisting of —$R_2$ and —$OR_2$ radicals.

2. Ethyl para-(beta-chloroisopropyl)benzyl methylphosphinate.

3. 1 - (beta - chloroethyl) - 4-(ethyl phenylphosphinatomethyl naphthalene.

4. Para - (beta - chloroethyl)benzyl diphenylphosphine oxide.

5. A process for preparing a beta-haloalkyl aromatic phosphorus compound corresponding to the general formula:

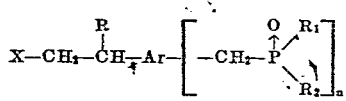

which comprises contacting 1 molar proportion of a beta-haloalkyl halomethyl aromatic compound corresponding to the general formula:

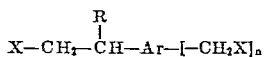

with at least $n$ molar proportions of an organo-phosphorus compound corresponding to a general formula selected from the group consisting of

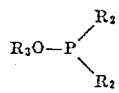

and

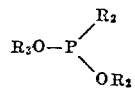

at a temperature of from about 50 to 200° C.; wherein, in each of the above formulae, X is a halogen radical, R is a radical selected from the group consisting of hydrogen and methyl, $n$ is an integer of from 1 to 3, Ar is a polyvalent aromatic residue selected from the group consisting of benzene, naphthalene and anthracene residues having a valency numerically equal to $n+1$, $R_2$ and $R_3$ are independently selected hydrocarbon radicals containing from 1 to 20 carbon atoms and $R_1$ is a radical selected from the group consisting of —$R_2$ and —$OR_2$ radicals.

6. A process for preparing an ethylenically unsaturated aromatic phosphorus compound corresponding to the general formula:

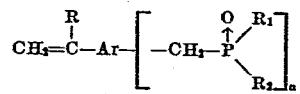

which comprises contacting 1 molar proportion of a beta-haloalkyl aromatic phosphorus compound corresponding to the general formula:

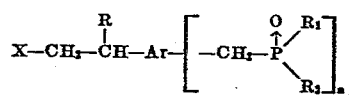

with at least 1 molar proportion of an alkali metal base in a substantially anhydrous polar solvent at a temperature of from about 50 to 120° C.; wherein, in each of the above formulae, X is a halogen radical, R is a radical selected from the group consisting of hydrogen and methyl, $n$ is an integer of from 1 to 3, Ar is a polyvalent aromatic residue selected from the group consisting of benzene, naphthalene and anthracene residues having a valency numerically equal to $n+1$, $R_2$ is a hydrocarbon radical containing from 1 to 20 carbon atoms and $R_1$ is a radical selected from the group consisting of —$R_2$ and —$OR_2$ radicals.

7. A process for preparing an ethylenically unsaturated aromatic phosphorus compound corresponding to the general formula:

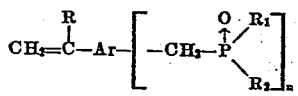

which comprises (1) contacting one molar proportion of a beta-haloalkyl halomethyl aromatic compound corresponding to the general formula:

with at least $n$ molar proportions of an organo-phosphorus compound corresponding to a general formula selected from the group consisting of

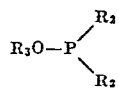

and

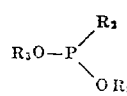

at a temperature of from about 50 to 200° C. and (2) subsequently contacting the product with at least an equimolar proportion of an alkali metal base in a substantially anhydrous polar solvent at a temperature of from about 50 to 120° C.; wherein, in each of the above formulae, X is a halogen radical, R is a radical selected from the group consisting of hydrogen and methyl, $n$ is an integer of from 1 to 3, Ar is a polyvalent aromatic residue selected from the group consisting of benzene, naphthalene and anthracene residues having a valency numerically equal to $n+1$, $R_2$ and $R_3$ are independently selected hydrocarbon radicals containing from 1 to 20 carbon atoms and $R_1$ is a radical selected from the group consisting of —$R_2$ and —$OR_2$ radicals.

References Cited in the file of this patent

UNITED STATES PATENTS 2,764,561  9/56  McMaster et al. _____ 260—2.2
2,980,721  4/61  McMaster et al. _____ 260—461

OTHER REFERENCES

Kosolapoff: "Organo-Phosphorus Compounds," pages 121–123, John Wiley and Sons, Inc., New York, N. Y. (1950).

JOSEPH L. SCHOFER, *Primary Examiner.*

M. STERMAN, H. N. BURSTEIN, L. J. BERCOVITZ,
*Examiners.*

UNITED STATES PATENT OFFICE
CERTIFICATE OF CORRECTION

Patent No. 3,161,667 December 15, 1964

John G. Abramo et al.

It is hereby certified that error appears in the above numbered patent requiring correction and that the said Letters Patent should read as corrected below.

Column 6, lines 60 to 64, the general formula should appear as shown below instead of as in the patent:

(b")

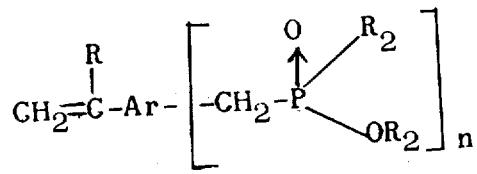

Signed and sealed this 4th day of May 1965.

(SEAL)
Attest:

ERNEST W. SWIDER
Attesting Officer

EDWARD J. BRENNER
Commissioner of Patents